United States Patent
Eloo

(10) Patent No.: US 7,157,032 B2
(45) Date of Patent: Jan. 2, 2007

(54) METHOD AND APPARATUS FOR MAKING CRYSTALLINE PET PELLETS

(75) Inventor: Michael Eloo, Xanten (DE)

(73) Assignee: Gala Industries, Inc., Eagle Rock, VA (US)

( * ) Notice: Subject to any disclaimer, the term of this patent is extended or adjusted under 35 U.S.C. 154(b) by 375 days.

(21) Appl. No.: 10/717,630

(22) Filed: Nov. 21, 2003

(65) Prior Publication Data

US 2005/0110184 A1  May 26, 2005

(51) Int. Cl.
- B29B 9/06 (2006.01)
- B29B 9/00 (2006.01)
- B29B 9/16 (2006.01)
- B29C 67/00 (2006.01)
- B29C 71/00 (2006.01)
- B29C 47/00 (2006.01)

(52) U.S. Cl. .................. 264/143; 264/234; 425/313; 425/DIG. 230

(58) Field of Classification Search ............... 264/143, 264/234; 83/906; 425/313, 70, DIG. 230 425/68, 67
See application file for complete search history.

(56) References Cited

U.S. PATENT DOCUMENTS

| | | | |
|---|---|---|---|
| 3,544,525 A * | 12/1970 | Balint et al. ............ 528/483 |
| 3,988,085 A * | 10/1976 | Krchma .................... 425/71 |
| 4,632,752 A * | 12/1986 | Hunke ...................... 210/173 |
| 5,290,913 A | 3/1994 | McAllister et al. | |
| 5,532,335 A | 7/1996 | Kimball et al. | |
| 5,607,700 A * | 3/1997 | Kando et al. ............ 425/71 |
| 5,609,892 A | 3/1997 | Garcia et al. | |
| 5,633,018 A * | 5/1997 | Stouffer et al. ........... 425/8 |
| 5,830,981 A * | 11/1998 | Koreishi et al. .......... 528/283 |
| 5,895,617 A * | 4/1999 | Mizuguchi et al. ....... 264/141 |
| 2005/0056961 A1* | 3/2005 | Bonner ..................... 264/143 |
| 2005/0062186 A1 | 3/2005 | Fellinger | |
| 2005/0110182 A1 | 5/2005 | Eloo | |
| 2005/0154183 A1* | 7/2005 | Ekart et al. ............... 528/486 |

FOREIGN PATENT DOCUMENTS

| | | |
|---|---|---|
| DE | 102 09 149 | 9/2003 |
| EP | 0 305 862 | 3/1989 |
| GB | 1278297 | 6/1972 |
| WO | 03/037588 | 5/2003 |
| WO | 2004/033174 | 4/2004 |

* cited by examiner

Primary Examiner—Christina Johnson
Assistant Examiner—Matthew J. Daniels
(74) Attorney, Agent, or Firm—Jacobson Holman PLLC

(57) ABSTRACT

A method and apparatus for underwater pelletizing and subsequent drying of polyethylene terephthalate (PET) polymers and other high temperature crystallizing polymeric materials to crystallize the polymer pellets without subsequent heating. High velocity air or other inert gas is injected into the water and pellet slurry line to the dryer near the pelletizer exit. The slurry line has a substantially straight component, and air is preferably injected at the end of the straight component nearest the pelletizer exit and in a direction substantially coincident with the axis of the straight component. The air injection significantly increases the speed of the pellets into and out of the dryer such that the PET polymer pellets leave the dryer above at least 135° C., and preferably above 145° C., to self-initiate crystallization.

20 Claims, 3 Drawing Sheets

METHOD AND APPARATUS FOR MAKING CRYSTALLINE PET PELLETS

FIELD OF THE INVENTION

The present invention generally relates to a method and apparatus for underwater pelletizing and subsequent drying of polyethylene terephthalate (PET) polymers. More specifically, the present invention relates to a method and apparatus for underwater pelletizing PET polymers and subsequent drying the PET polymer pellets in a manner to self-initiate the crystallization process of the PET particles and produce pellets having a crystalline structure rather than an amorphous structure.

BACKGROUND OF INVENTION AND PRIOR ART

Underwater pelletizing systems for producing pellets of polymeric or other plastic materials has been known for many years. The starting materials such as plastic polymers, coloring agents, additives, fillers and reinforcing agents, and modifiers, are mixed in kneaders. In the process, a melt is produced which is extruded or pressed through dies to form strands which are immediately cut by rotating cutter blades in the water box of the underwater pelletizer. Water with or without additives is continuously flowing through the water box to cool and solidify the polymer strands and pellets and carry the pellets out of the water box through transport piping to a dryer, such as a centrifugal dryer, where the water is removed from the pellets.

For quite some time, the polymer industry has sought to process PET polymers into a pellet shape using underwater pelletizer systems. A major drawback of using underwater pelletizing, as well as other pelletizing systems, for processing PET into pellet shapes is the typically amorphous condition of these pellets when they leave the dryer of the underwater pelletizing system. The amorphous nature of the resulting pellet is caused by the fast cooling of the PET material once introduced into the water flow in the water box of underwater pelletizer and while the water and pellet slurry is being transported by appropriate piping to the dryer.

End users of PET polymer pellets typically require that the pellets be in a crystalline state, rather than an amorphous state, principally for two reasons, both relating to the fact that the end user wants to process the PET pellets in a substantially dry condition, with zero or near zero water content. First, PET polymers are very hygroscopic, and crystalline PET pellets absorb considerably less moisture during shipment and storage than amorphous PET pellets. Accordingly, crystalline PET pellets can be dried to the requisite zero or near zero moisture content more easily by the end user. Second, the temperature required to completely dry PET polymers is higher than the temperature at which amorphous PET pellets convert to the crystalline form. Therefore, when drying amorphous PET pellets, it is necessary to first achieve crystallization at the requisite lower temperature before raising the temperature to the drying temperature. Otherwise, the amorphous PET polymer pellets may agglomerate and destroy the pellet form.

As a result, manufacturers of PET pellets must typically subject the amorphous PET pellets to a secondary heating step of several hours at a very high temperatures, usually in excess of 80–100° C., to change the amorphous structure of the pellets to a crystalline structure. This is a very expensive second step in order to convert the PET polymer pellets into the desired crystalline state.

It is also known generally that air can be injected into the exit stream of a water and pellet slurry from a pelletizer in order to enhance the transport of the water/pellet slurry. See, for example, U.S. Pat. No. 3,988,085.

SUMMARY OF THE INVENTION

In order to achieve a processed PET polymer pellet having the desired crystallinity, the pellet must exit the underwater pelletizing system at a temperature higher than about 135° C. At temperatures at or above this temperature, PET pellets can self-initiate the crystallization process and ultimately provide a crystalline character instead of an amorphous one. Therefore, in accordance with the present invention, the underwater pelletizing system should produce PET pellets in a hot enough condition to self-initiate the desired crystallization. This elevated heat condition can be accomplished by reducing the residence time of the pellets in the water slurry in order to leave enough heat in the PET pellets during the pelletizing and drying stages so that the crystallization process is initiated from inside the pellets. If desired, the pellets can be stored in a heat retaining condition, such as in a heat insulating container, to complete the crystallization process. For example, coated steel or plastic containers should be acceptable, instead of the stainless steel boxes conventionally used.

Typically, increasing the water flow through the water box of the underwater pelletizer and increasing the water temperature, along with pipe dimensional changes and reducing the distance between the pelletizer and dryer unit, does not help to sufficiently maintain the pellet temperature. Under such circumstances, the PET pellets still leave the dryer at a temperature, usually below 100° C., which is below the temperature (about 135° C.) at which crystallization can occur. Accordingly, it is necessary to significantly increase the speed of pellet flow from the exit of the underwater pelletizer and into and through the dryer.

This increased pellet speed is accomplished in accordance with the present invention by injecting air or other suitable gas into the transportation piping leading to the dryer just after the cut pellets and water slurry exit the water box of the pelletizer unit. It has been found that the injected air helps to separate the water from the pellets in the transportation piping, significantly speeds up the transport of the pellets to the dryer and can serve to generate a pellet temperature exiting the dryer at greater than about 145° C. While the PET polymer pellets may come out of the dryer in an amorphous condition, there is still sufficient heat remaining inside the pellets for the crystallization process to occur without the necessity of the second heating stage heretofore used to make PET pellets using underwater pelletizing systems.

The air introduced into the slurry line leading to the dryer immediately after the exit from the water tank is at a very high velocity. It has been found that a flow rate of 100 cubic meters ($m^3$)/hour through a valve at a pressure of 8 bar and into a slurry 1.5 inch pipe line produces the requisite air velocity for the present invention. The volume of air introduced into the exiting water and pellet slurry produces an overall gas/slurry mixture in the nature of a mist and is likely to have a gas component of 98%–99% or more by volume of the overall mixture. The air injection into the slurry line dramatically increases the speed of the pellet flow from the water box to the exit of the dryer to a rate less than one second. While air is the preferred gas in view of its inert nature and ready availability, other inert gases such as nitrogen or similar gases could be used.

It has been found that crystalline PET pellets can be formed in accordance with the method and apparatus of the present invention, with a mean temperature of the PET pellets exiting the dryer above about 145° C., if the residence time of the pellets from the point of formation by the cutter blades at the die face to the exit from the centrifugal dryer is reduced by the injection of high velocity air or other gas into the slurry line. This shortened residence time should assure that the PET pellets will exit the dryer of the underwater pelletizing system at a mean temperature greater than 145° C. and will retain sufficient heat inside the pellets to initiate the desired crystallization in the amorphous pellets, particularly if the pellets are properly stored in a heat insulating container. Hence, the necessity of a secondary heating step is eliminated.

Accordingly, it is an object of the present invention to provide a method and apparatus for processing PET polymers in an underwater pelletizing system which can produce crystallization in the PET pellets that exit from the dryer.

It is another object of the present invention to provide a method and apparatus for producing crystallization in PET polymer pellets utilizing an underwater pelletizing system without the necessity of an expensive secondary heating stage to convert amorphous PET pellets to crystalline PET pellets.

It is a further object of the present invention to provide a method and apparatus for underwater pelletizing PET polymer in which the pellets are transported through the equipment at a sufficiently rapid speed so that the mean temperature of the pellets exiting the dryer is greater than about 145° C.

A still further object of the present invention is to provide a method and apparatus for the underwater pelletizing of PET polymer in accordance with the preceding object in which a gas is injected into the water and pellet slurry exiting the pelletizer to produce a water vapor mist form of slurry handling, thereby providing better heat retention.

It is yet another object of the present invention to provide a method and apparatus for producing PET polymer pellets using an underwater pelletizing system in which the pellets exiting the dryer have sufficient heat remaining inside the pellets for crystallization of the PET pellets to occur, a process that may include proper conditions of storage, if necessary.

It is still a further object of the present invention to provide an underwater pelletizing method and apparatus for producing PET pellets in which the residence time of the PET pellets from the time of extrusion at the die face until exit from the centrifugal dryer is reduced to less than about 1 second by gas injection into the slurry line from the pelletizer to the dryer.

These together with other objects and advantages which will become subsequently apparent reside in the details of construction and operation of the invention as more fully hereinafter described and claimed, reference being had to the accompanying drawings forming a part hereof, wherein like numerals refer to like parts throughout.

DESCRIPTION OF THE INVENTION

Figure 1:
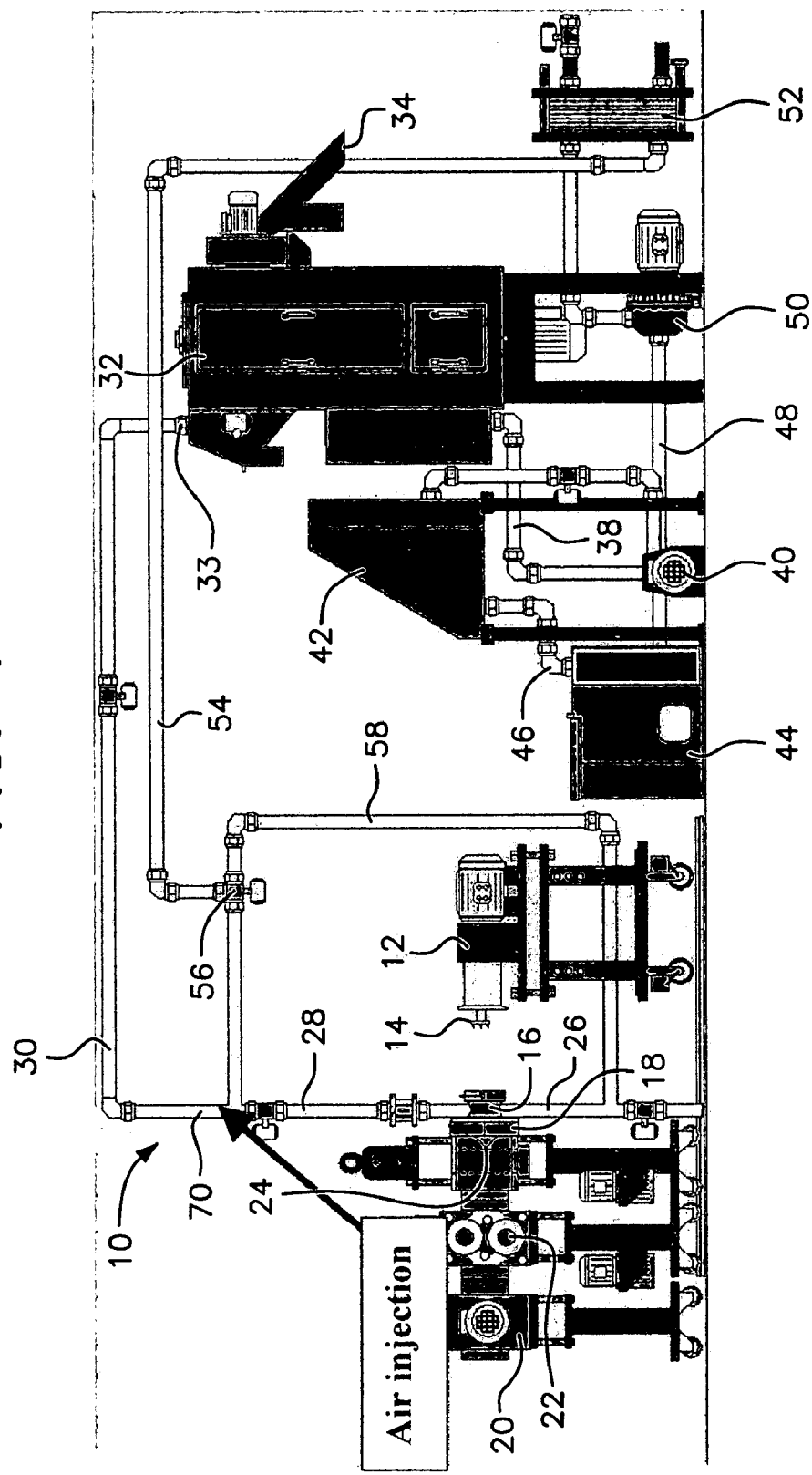
FIG. 1 is a schematic illustration of a conventional underwater pelletizing system, including an underwater pelletizer and centrifugal dryer as manufactured and sold by Gala Industries, Inc. ("Gala") of Eagle Rock, Va., with air injection in accordance with the present invention.

Although only preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose. For example, the term "water" includes not only water itself, but also water with one or more additives included, which are added to the water during the underwater pelletizing step for various purposes used by those skilled in the art of underwater pelletizing.

An underwater pelletizing system for use in association with the present invention is schematically shown in FIG. 1 and is generally designated by reference number 10. The system 10 includes an underwater pelletizer 12, such as a Gala underwater pelletizer, with cutter hub and blades 14 shown separated from the water box 16 and die plate 18. In the underwater pelletizing system 10, PET polymer is fed from above from a polymer vat (not shown) into a screen changer 20 which removes any solid particles or other material. The PET polymer is then fed through gear pump 22 to control and maintain a smooth flow of the polymer into the polymer diverter 24 and die plate 18. The PET polymer is typically extruded through holes in the die plate at a temperature of about 260° C. The PET polymer strands formed by the die holes enter into the water box 16 and are cut by the cutter hub and blades 14 into the desired pellets. Cold water flows into the water box 16 through pipe 26 and the water and cut pellet slurry exits through pipe 28.

The water and pellet slurry is then conveyed through the slurry line 30 into a dryer 32, such as a Gala centrifugal dryer, at inlet 33. The pellets are dried in the dryer 32 and exit the dryer at 34. The water removed from the dried pellets exits the dryer 32 through pipe 38 and is conveyed by pump 40 into a fines removal sieve 42 and thence into a water tank 44 through pipe 46. The recycled water leaves water tank 44 through pipe 48 and pump 50 into a water heat exchanger 52 to reduce the water temperature. The cooled water is recycled through pipe 54 past bypass valve 56 and pipe 58 to inlet pipe 26 and then into the water box 16.

In accordance with the present invention, air is injected into the underwater pelletizing system in slurry line 30 at point 70, preferably near the beginning of the slurry line 30 adjacent the exit from the water box 16, in order to enhance the transport of PET pellets in the slurry line 30 and keep the PET pellets at a high enough temperature to foster the desired crystallization.

The air is conveniently injected into the slurry line 30 at point 70 using a conventional compressed air line typically available in most manufacturing facilities, such as with a pneumatic compressor, and a standard ball valve sufficient to produce a high velocity air flow in the slurry line 30. This is readily achieved by a flow rate in the range of 100 m³/hour through a standard ball valve at a pressure of 8 bar into a slurry line comprising a standard 1.5 inch pipe. This high velocity air (or other gas) when contacting the water and hot pellets generates a water vapor mist. The pellets tend to disperse to the inside circumference of the pipe as they move rapidly therethrough to the dryer. It is estimated that the volume of air in the overall gas/slurry mixture is on the order of 98%–99% or more by volume of the overall mixture. The air injected into the slurry line 30 at point 70 increases the speed of the pellet flow from the water box 16 to the exit 34 of the dryer 32 to a rate of less than one second.

The mean temperature of the PET polymer pellets exiting the dryer 32 at 34 in accordance with the present invention should be above about 145° C. At this temperature, the PET pellets will retain sufficient heat inside the pellets to initiate crystallization therein, without the necessity of a secondary heating step. If desired or necessary, the PET polymer pellets exiting the dryer 32 can be placed in appropriate heat insulating containers so that the retained heat in the PET pellets is sufficient to complete the desired crystallization process, before the pellets cool below the crystallization temperature.

Figure 2:
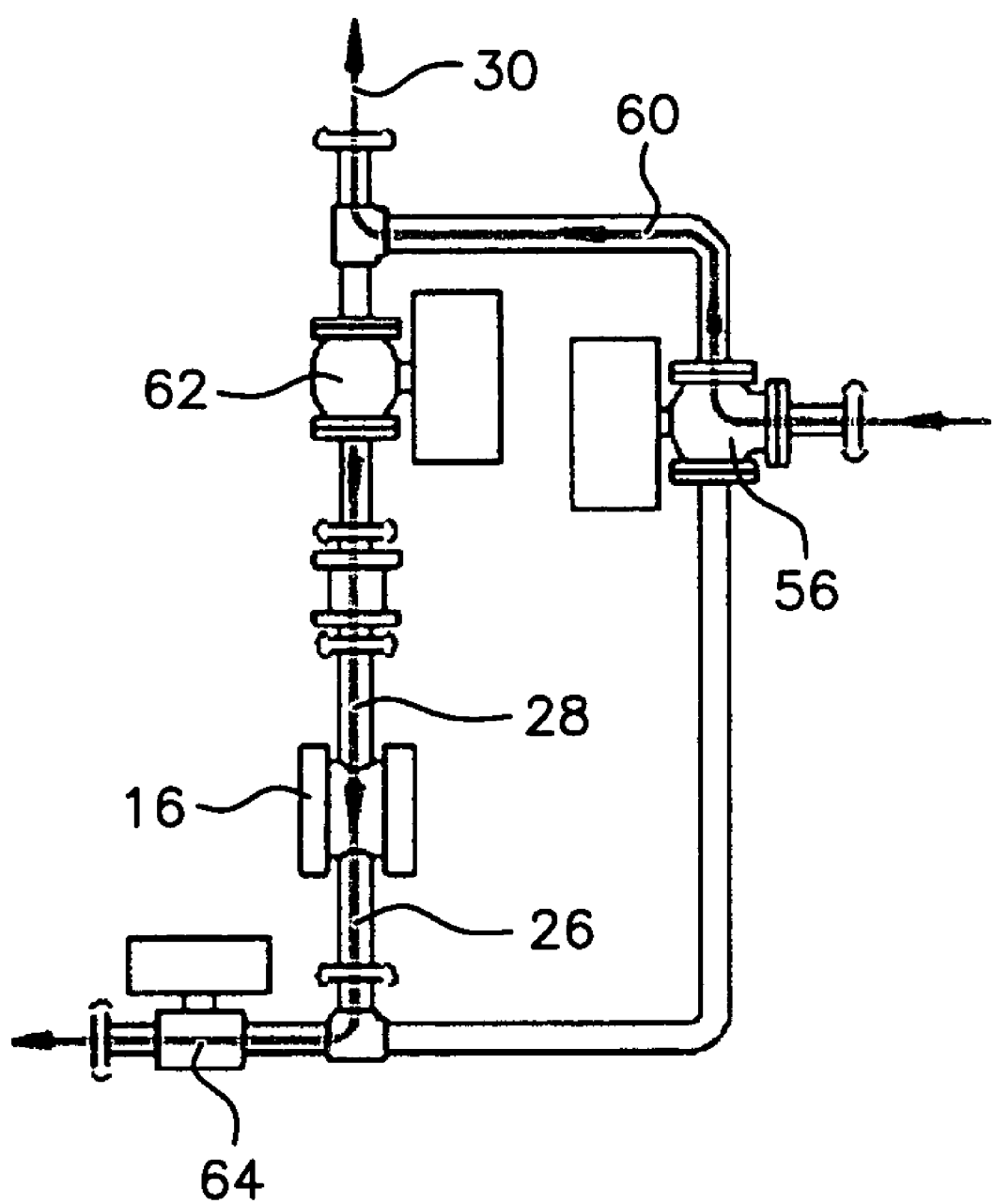
FIG. 2 illustrates certain components of the underwater pelletizing system shown in FIG. 1 during a bypass mode when the process line has been shut down.

In by-pass mode shown in FIG. 2, the recycled water goes through bypass 56 into pipe 60 and then into slurry line 30. In the bypass mode, the valve 62 is closed and the water/pellet slurry in line 30 and water box 16, along with the water in inlet line 26 can drain from the system out of drain valve 64.

Figure 3:
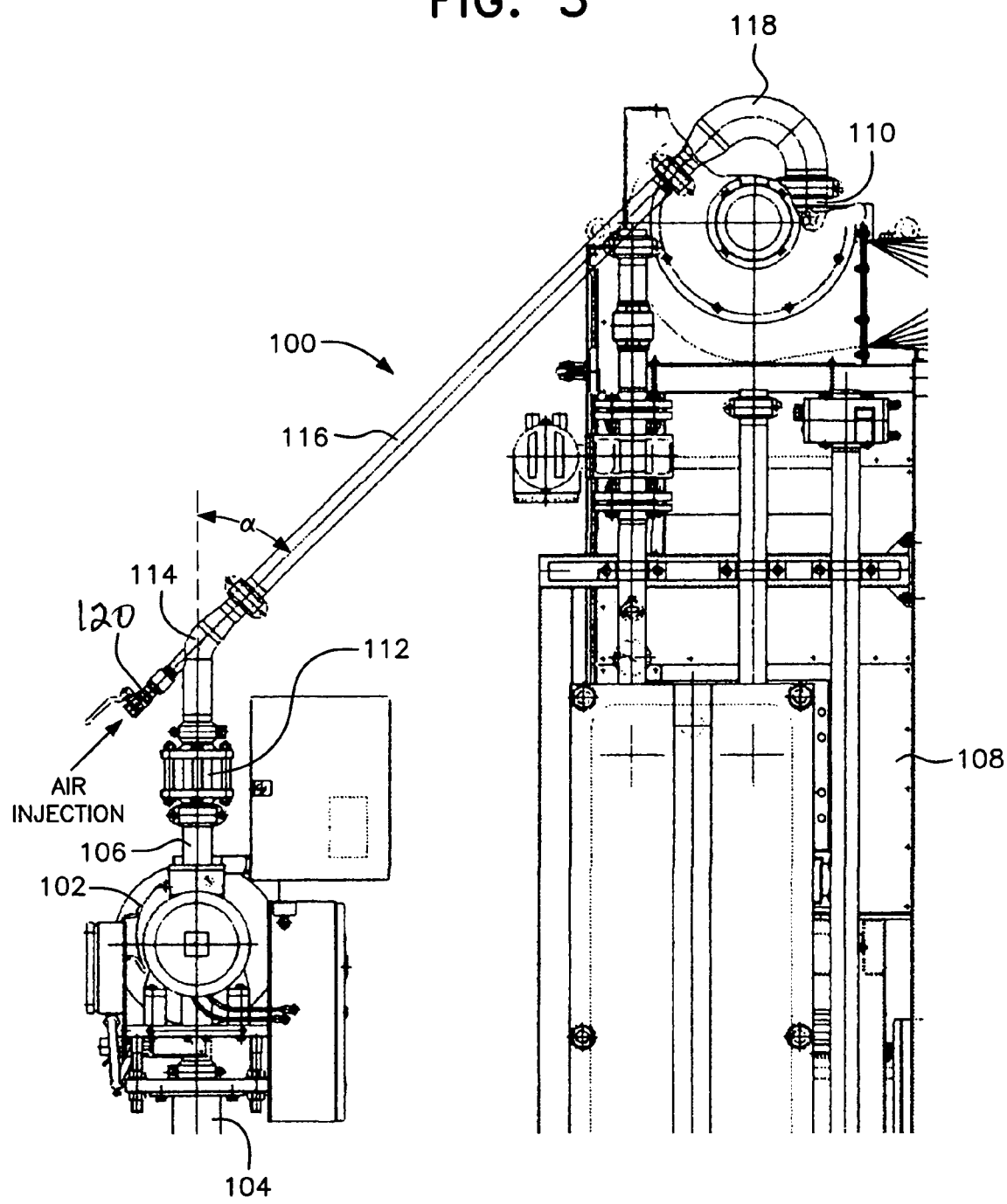
FIG. 3 is a schematic illustration showing a preferred method and apparatus for air (or gas) injection into the slurry line from the pelletizer to the dryer in accordance with the present invention.

FIG. 3 schematically illustrates a preferred arrangement for air injection into the slurry line of an underwater pelletizing system in accordance with the present invention and is generally designated by reference numeral 100. The underwater pelletizer 102 illustrated is a Gala Model No. A5 PAC 6, with water inlet pipe 104 and slurry exit line 106. The dryer 108 illustrated is a Gala Model No. 12.2 ECLN BF, with the slurry entrance 110 at the top. Inasmuch as the exit from the underwater pelletizer 102 into slurry line 106 is significantly below the entrance 110 to the centrifugal dryer 108, when both are level on a manufacturing floor, it is necessary to transport the water and pellet slurry upwardly from the pelletizer exit to the dryer entrance. The water and pellet slurry thus moves through valve 112 past angled elbow 114, through angled slurry line 116 past enlarged elbow 118 and then into the entrance 110 of dryer 108. The air injection is past nozzle or valve 120 and directly into the angled elbow 114.

As shown in FIG. 3, the angled slurry line 116 is preferably straight and has an enlarged elbow 118 at its exit end. The enlarged elbow facilitates the transition of the high velocity water and pellet slurry from the straight slurry line 116 into the dryer entrance 110 and reduces potential agglomeration into the dryer 108. Further, the air injection into the angled elbow 114 is preferably in line with the axis of slurry line 116 to maximize the effect of the air injection on the water and pellet slurry and to keep constant aspiration of the air/slurry mixture.

While the angle $\alpha$ between the vertical axis of slurry line 116 and the longitudinal axis of angle slurry line 116 is most preferably about 45°, as shown in FIG. 3, a preferred range is 30°–60°. Moreover, the angle $\alpha$ can be varied from 0° to 90°, and even more in the event the water and pellet slurry exit from pelletizer 102 is higher than the entrance 110 to dryer 108 when, for example, the pelletizer and dryer are placed at different levels in the plant or the heights of the components are different than shown in FIG. 3.

TRIAL EXAMPLES

Molten PET polymer was continuous extruded into an overall underwater pelletizing system as illustrated in FIG. 1, using a Gala Underwater Pelletizer Model No. A5 PAC 6 and a Gala Model 12.2 ECLN BF Centrifugal Dryer, in the arrangement shown in FIG. 3. The melt temperature was about 265° C. and the cutter blade speed in pelletizer 102 was varied between 2500 and 4500 RPM. The die plate was typical for PET polymers and a typical 3.5 mm die plate with elongated lands was used. The melt velocity through the die holes during the trials was constant at 40 kg/hole/hr.

The pipe for slurry line 116 was a standard 1.5 inch pipe and its length was 4.5 meters. The speed of centrifugal dryer 108 was kept constant during the trials, and the countercurrent air flow through the dryer 108 was also kept constant during the trials.

The air injection flow rate to nozzle or valve 118 was varied from 0 to a maximum of 100 m³/hour, as indicated in Table 1 below, and the water flow and pellet size also varied, again as indicated in Table 1 below.

The parameters and results of the trials are set forth in Table 1 below.

TABLE 1

| Trial | Pellet size (mm) | Weight of a pellet (g) | Water - temp (° C.) | Water rate (m³/h) | Air injection rate (m³/h) | Pellet temp (° C.) | Crystallinity grade (%) |
|---|---|---|---|---|---|---|---|
| 1 | 5.5 × 3.0 | 0.032 | 76 | 13 | 100 | 155 | 98 |
| 2 | 4.5 × 3.0 | 0.0299 | 74 | 13 | 100 | 152 | 98 |
| 3 | 4.5 × 3.0 | 0.0306 | 71 | 19 | 0 | 105 | 0 |
| 4 | 4.0 × 2.6 | 0.0185 | 64 | 19 | 100 | 130 | 60 |
| 5 | 3.5 × 3.0 | 0.0256 | 69 | 18 | 100 | 136 | 80 |
| 6 | 4.1 × 3.1 | 0.0267 | 73 | 18 | 100 | 146 | 98 |

The pellet temperature and percentage crystallinity as set forth in the last two columns of Table 1 was determined by examining the product coming out of the dryer 108 at the end of each trial.

It is believed that 135° C. is the minimum temperature for PET polymer pellets to leave the dryer, when the pellets have the sizes used in the above tests. However, a lower exit temperature may be possible for this invention if larger size PET pellets are made.

While the present invention is particularly applicable to the underwater pelletization of PET polymers, it is believed that other polymers which crystalize at elevated temperatures and which retain heat when subjected to high temperatures may also be appropriate for the present invention. Such polymers include certain grades of thermoplastic polyurethane (TPU), PET copolymers and/or PET blends.

The foregoing is considered as illustrative only of the principles of the invention. Since numerous modifications and changes will readily occur to those skilled in the art, it is not desired to limit the invention to the exact construction and operation shown and described. Accordingly, all suitable modifications and equivalents may be resorted to, falling within the scope of the invention.

The invention claimed is:

1. A method for processing crystallizing polymeric materials into pellets, which comprises:
   extruding into strands a crystallizing polymeric material having sufficient heat for crystallization;
   cutting the extruded strands into pellets in a water stream;

transporting said pellets in said water stream as a water and pellet slurry;

injecting an inert gas at a high velocity into said pellet and water slurry such that said pellets retain sufficient heat for crystallization of said polymeric material;

drying said pellets in a dryer; and crystallizing said pellets after exiting said dryer without a second heating stage.

2. The method of claim 1 wherein said material includes polyethylene terephthalate polymer.

3. The method of claim 1 wherein the gas injected into said slurry increases pellet flow speed from a pelletizer at said step of extrusion to dryer exit to a rate of less than about one second.

4. The method of claim 1 wherein said polymeric material is a high temperature crystallizing polymeric material and said pellets are cooled in said water stream.

5. A method for processing polyethylene terephthalate polymers into pellets using an apparatus including an underwater pelletizer and a dryer, said method comprising:

extruding strands of polyethylene terephthalate polymer through a die plate for cutting in said underwater pelletizer;

cutting the polyethylene terephthalate polymer strands into pellets in a cutting chamber of said pelletizer;

transporting said polyethylene terephthalate pellets out of said cutting chamber as a water and pellet slurry; and injecting a high velocity gas into said water and pellet slurry to convert the water into a water vapor mist and enhance the speed of the pellets into and out of said dryer, with said pellets retaining sufficient internal heat upon exiting said dryer for crystallization of said pellets; and crystallizing said pellets after exiting said dryer without a second heating stage.

6. The method as claimed in 5 wherein said polyethylene terephthalate pellets exiting said dryer are placed in a heat insulating container.

7. The method as claimed in claim 5 wherein said polyethylene terephthalate pellets exit said dryer at a mean temperature above about 135° C.

8. The method as claimed in claim 7 wherein said polyethylene terephthalate pellets exit said dryer at a temperature above about 145° C.

9. The method as claimed in claim 5 wherein said step of transporting said polyethylene terephthalate pellets out of said pelletizer to said dryer includes substantially straight transporting said slurry upwardly at an angle from the vertical between 30° and 60°.

10. The method as claimed in claim 9 wherein said angle is about 45°.

11. The method as claimed in claim 5 wherein said pressurized gas is air.

12. The method as claimed in claim 5 wherein said gas is injected substantially in alignment with a flow direction of said water and pellet slurry.

13. The method as claimed in claim 5 wherein said high velocity gas is injected at a flow rate of at least about 100 cubic meters per hour at a pressure of about 8 bar.

14. The method as claimed in claim 5 wherein said vapor mist has' a gas component of about 98% by volume.

15. The method of claim 5 wherein the gas injected into said slurry increases pellet flow speed from the pelletizer to an exit of said dryer to a rate of less than about one second.

16. A method for processing polyethylene terephthalate polymers into crystallized pellets using an apparatus having an underwater pelletizer, a centrifugal dryer and transportation piping therebetween, said method comprising:

cutting polyethylene terephthalate polymer strands into pellets in the underwater pelletizer;

transporting said pellets out of said pelletizer and into said transportation piping as a water and pellet slurry;

introducing a high velocity inert gas into said water and pellet slurry in said transportation piping to separate the water from the pellets; and transporting all of said water and pellets into said centrifugal dryer located downstream of said gas introduction, said pellets exiting said dryer with sufficient internal heat for crystallization of said pellets.

17. The method of claim 16 wherein the gas introduced into said slurry increases a speed of pellet flow from said pelletizer to an exit of said dryer to a rate of less than about one second.

18. The method of claim 16 wherein said step of introducing a high velocity gas includes injecting said gas at a flow rate of about 100 cubic meters per hour at a pressure of about 8 bar.

19. The method of claim 18 wherein said injected gas produces a water vapor mist having a gas component of about 98% by volume.

20. The method of claim 16 wherein crystallization of said pellets occurs using only said internal heat retained from extrusion and in an absence of any secondary heating step while passing through said apparatus.

* * * * *